US012012002B2

(12) United States Patent
MacMillian et al.

(10) Patent No.: US 12,012,002 B2
(45) Date of Patent: Jun. 18, 2024

(54) TRANSMISSION UNIT AND HYBRID MODULE WITH A TRANSMISSION-SIDE BULKHEAD

(71) Applicant: Schaeffler Technologies AG & Co. KG, Herzogenaurach (DE)

(72) Inventors: Loyal George MacMillian, Karlsruhe (DE); Stefan Mackowiak, Malsch (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 493 days.

(21) Appl. No.: 17/291,320

(22) PCT Filed: Oct. 8, 2019

(86) PCT No.: PCT/DE2019/100869
§ 371 (c)(1),
(2) Date: May 5, 2021

(87) PCT Pub. No.: WO2020/094177
PCT Pub. Date: May 14, 2020

(65) Prior Publication Data
US 2022/0001738 A1    Jan. 6, 2022

(30) Foreign Application Priority Data

Nov. 5, 2018    (DE) .......................... 102018127511.0
Feb. 14, 2019    (DE) .......................... 102019103771.9

(51) Int. Cl.
*B60K 6/405*    (2007.10)
*B60K 6/26*    (2007.10)
*B60K 6/387*    (2007.10)

(52) U.S. Cl.
CPC ................ *B60K 6/405* (2013.01); *B60K 6/26* (2013.01); *B60K 6/387* (2013.01)

(58) Field of Classification Search
CPC .... B60K 6/405; B60K 2006/262; F16H 57/10
See application file for complete search history.

(56) References Cited

U.S. PATENT DOCUMENTS 6,354,974 B1 *   3/2002   Kozarekar ............... B60K 6/26
                                                       903/910
8,863,926 B2 *   10/2014  Knowles ................ B60K 6/387
                                                       903/952

(Continued)

FOREIGN PATENT DOCUMENTS

CN    101678752 A    3/2010
CN    103299096 A    9/2013

(Continued)

OTHER PUBLICATIONS

USPTO Machine Translation (retrieved from FIT database) of the Description of DE 102012022290 A1, Majer et al., May 15, 2014. (Year: 2023).*

*Primary Examiner* — Daniel D Yabut
(74) *Attorney, Agent, or Firm* — Volpe Koenig

(57) ABSTRACT

A hybrid module for the transmission of torque in a drive train of a vehicle having a transmission. The hybrid module received in a housing has a first electric motor, a first clutch, which can be actuated by a first clutch actuation unit, and has a first multiple clutch disc assembly, first clutch input and first clutch output, and a bulkhead fastened to the housing. The bulkhead is arranged axially between the first clutch and the transmission and can be releasably connected to the housing. A transmission unit in a drive train of a vehicle having such a hybrid module and at least one first brake of a transmission, wherein the first brake is a first support element fixed to the housing and has a first rotary element which can be braked by the first brake. The first support (Continued)

element is connected in a rotationally fixed manner to or configured in one piece from the bulkhead.

18 Claims, 1 Drawing Sheet

(56) References Cited

U.S. PATENT DOCUMENTS

| | | | |
|---|---|---|---|
| 9,193,255 | B2 | 11/2015 | Arnold et al. |
| 9,421,857 | B2 * | 8/2016 | Frait ........................ B60K 6/48 |
| 9,944,164 | B2 * | 4/2018 | Kanada .................. B60K 6/405 |
| 2008/0047799 | A1 * | 2/2008 | Combes ................. F16D 48/02 |
| | | | 192/58.5 |
| 2013/0310218 | A1 * | 11/2013 | Fujita ................... B60W 20/40 |
| | | | 477/79 |
| 2015/0258884 | A1 | 9/2015 | Ideshio et al. |
| 2016/0169374 | A1 * | 6/2016 | Kanada .................. F16H 3/728 |
| | | | 903/910 |

FOREIGN PATENT DOCUMENTS

| | | | | |
|---|---|---|---|---|
| CN | 103863099 | A | 6/2014 | |
| CN | 106438879 | A | 2/2017 | |
| DE | 102008040499 | A1 | 1/2010 | |
| DE | 102009059944 | | 7/2010 | |
| DE | 102012022290 | | 5/2014 | |
| DE | 112015002458 | T5 * | 2/2017 | ............ B60K 6/387 |
| DE | 102007060165 | | 6/2019 | |
| EP | 2287487 | | 2/2011 | |
| EP | 2573910 | | 3/2013 | |

\* cited by examiner

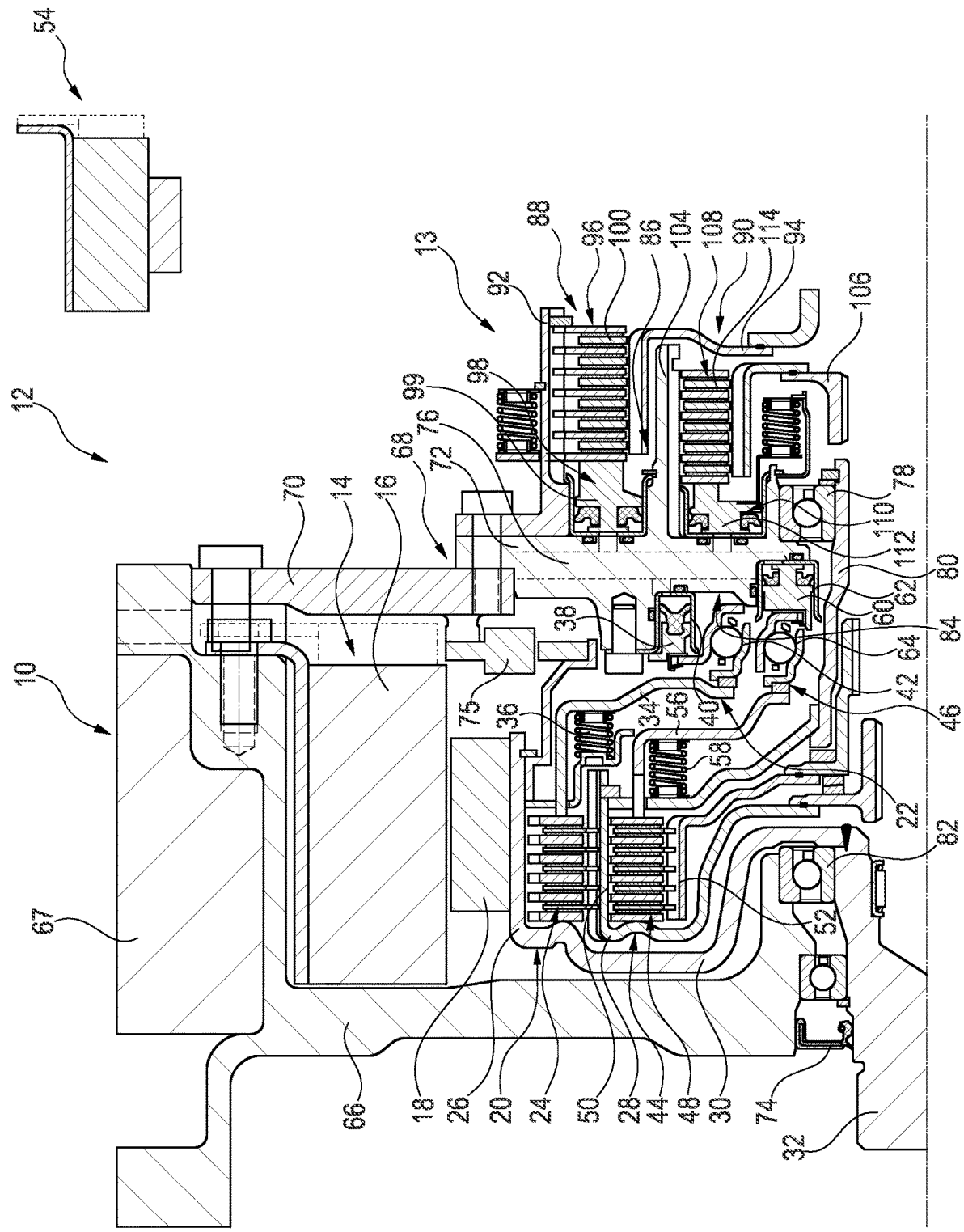

TRANSMISSION UNIT AND HYBRID MODULE WITH A TRANSMISSION-SIDE BULKHEAD

CROSS-REFERENCE TO RELATED APPLICATIONS

This application is the U.S. National Phase of PCT Appln. No. PCT/DE2019/100869, filed Oct. 8, 2019, which claims priority to DE 102018127511.0, filed Nov. 5, 2018 and DE 102019103771.9, filed Feb. 14, 2019, the entire disclosures of which are incorporated by reference herein.

TECHNICAL FIELD

The disclosure relates to a hybrid module and a transmission unit.

BACKGROUND

A generic hybrid module is known for example from DE 10 2009 059 944 A1. It shows a hybrid module for a drive train of a vehicle, having a first separating clutch, an electric motor and a second separating clutch, wherein the first separating clutch in the torque flow is arranged between an internal combustion engine in the drive train and the electric motor and the second separating clutch in the torque flow is arranged between the electric motor and a transmission in the drive train, wherein the first separating clutch and the second separating clutch are arranged in a common wet space. The hybrid module is delimited on the transmission side by a wall that is configured in one piece with the transmission housing.

SUMMARY

The object of the present disclosure is to improve a hybrid module. The hybrid module should be able to be set up and arranged in a simple, inexpensive and space-saving manner. Furthermore, a transmission unit with a hybrid module is to be improved. The transmission unit should be able to be constructed and arranged more simply and more cost-effectively.

At least one of these objects is achieved by a hybrid module with one or more of the features disclosed herein. Accordingly, a hybrid module is proposed for the transmission of torque in a drive train of a vehicle with a transmission, wherein the hybrid module is received in a housing having a first electric motor, a first clutch which can be actuated by a first clutch actuation unit and a first multiple clutch disc assembly, a first clutch input and has a first clutch output, a bulkhead is fastened to the housing, wherein the bulkhead is arranged to be axial between the first clutch and the transmission and can be releasably connected to the housing.

This makes it possible to provide a highly integrated hybrid module that is inexpensive to build and easy to manufacture.

The first electric motor can be cooled by cooling oil. The first electric motor and the first clutch can be arranged in a common fluid chamber. The first electric motor can be arranged radially outside the first clutch. The first electric motor can operate in a P1 arrangement.

A speed sensor assigned to the first electric motor can be arranged on the bulkhead or on a component connected thereto. The speed sensor can be arranged on the housing or on a component connected thereto. Viewed from the first electric motor, the speed sensor can be arranged on the transmission side or axially opposite thereto. The speed sensor can be based on the eddy current principle, the resolver principle, or the Hall principle.

A second electric motor can be arranged independently of the first electric motor. The second electric motor can operate in a P3 arrangement.

The first clutch can selectively interrupt or effect a torque transmission between an internal combustion engine and/or the first electric motor and the transmission.

The first clutch input can be connected to the internal combustion engine. The first clutch input can be connected in a rotationally fixed manner, preferably in a fixed manner, to a rotor of the first electric motor. The first clutch input can comprise an outer plate carrier or an inner plate carrier.

The first clutch output can be connected to a second electric motor. The first clutch output can be connected directly or indirectly to a transmission input shaft of the transmission. The first clutch output can comprise an outer plate carrier or an inner plate carrier.

The bulkhead can be screwed to the housing. The bulkhead can be configured in one piece or in several parts, in particular in two parts. The bulkhead parts can be releasably connected to one another, for example screwed. Bulkhead parts can be arranged radially one above the other and/or axially adjacent to one another. The bulkhead can be constructed axially in multiple layers. In a preferred embodiment of the disclosure, the hybrid module is enclosed on the transmission side by the bulkhead and axially opposite by the housing. The hybrid module can be received in a fluid-tight manner by the housing. The hybrid module can share a common fluid chamber with the transmission. The bulkhead can enable a fluid passage. The hybrid module and the transmission can also each have a separate fluid chamber, which can be separated from one another by the bulkhead.

In a particularly preferred embodiment, the bulkhead can be fixedly and releasably connected to the housing independently of the first clutch and the first electric motor.

In one embodiment, the first clutch actuation unit is arranged on the bulkhead.

In an advantageous embodiment, the first clutch actuation unit has a first clutch actuation piston which is slidably received in a first receptacle, the first receptacle being directly connected to the bulkhead as a separate component or configured in one piece from the bulkhead. The first receptacle can be releasably connected to the bulkhead, for example screwed.

In a preferred embodiment, a second clutch is arranged which can be actuated by a second clutch actuation unit and has a second multiple clutch disc assembly, a second clutch input and a second clutch output. The first clutch output and the second clutch input can be connected to one another in a rotationally fixed or fixed manner, or they can be configured in one piece with one another. The first and second clutches can be nested radially. The second clutch input can be connected to a second electric motor. The second clutch output can be connected to a first transmission input shaft of the transmission. The second clutch input can comprise an outer plate carrier or an inner plate carrier. The second clutch output can comprise an outer plate carrier or an inner plate carrier. The first and/or second clutch can be cooled by cooling oil. The first and/or second clutch can run wet or dry. The hybrid module can run wet or dry. The first and/or second clutch actuation unit can be designed as a CSC actuation. The first and/or second clutch actuation unit can be acted upon by an actuation fluid through at least one hydraulic rotary feed-through in the bulkhead.

In a preferred embodiment, a first support bearing is arranged on the bulkhead, in particular on a radially inner region of the bulkhead. The first support bearing can bring about a radial and/or axial support of a component of the first and/or second clutch. The first support bearing can support an actuating force of the first and/or second clutch. The actuation force of the first and/or second clutch can be supported via the support bearing and the bulkhead. This enables an internally closed power flow to support the actuating force and a high degree of controllability of the first and/or second clutch.

Furthermore, a transmission unit in a drive train of a vehicle is proposed to achieve at least one of the objects specified above, comprising the hybrid module having at least one of the above features and comprising at least one first brake of a transmission, wherein the first brake has a first support element fixed to the housing and a first rotary element that can be braked by the first break, wherein the first support element is connected in a rotationally fixed manner to the bulkhead or is configured in one piece from the bulkhead.

This enables a highly integrated transmission unit to be provided. After production, the transmission unit can be independently tested and checked and then installed in the drive train.

The transmission can be a planetary gear. The transmission can be a Dedicated Hybrid Transmission (DHT).

The first support element can comprise a plate carrier, in particular an outer plate carrier or an inner plate carrier. The first brake can comprise a first friction disc assembly, which can bring about a frictional-fit connection between the first support element and the first rotary element via a first brake actuation unit. The first rotary element can comprise an outer plate carrier or an inner plate carrier. The first friction disc assembly can have first brake friction discs. The first brake friction plates can have a friction lining on one and only one axial side. This can increase the heat resistance of the first brake. The first brake actuation unit can have a displaceable, in particular axially displaceable, first brake actuation piston.

A second brake comprising a second support element fixed to the housing and a second rotary element which can be braked by the second brake can be arranged, wherein the second support element is connected in a rotationally fixed manner to the bulkhead or configured in one piece from the bulkhead. The second support element can comprise a plate carrier, in particular an outer plate carrier or an inner plate carrier. The second rotary element can comprise a plate carrier, in particular an outer plate carrier or an inner plate carrier.

The first and second brakes can be arranged to be nested radially.

In an advantageous embodiment, the first clutch actuation unit is arranged on a first axial side of the bulkhead facing the first clutch and the first brake actuation unit is arranged on an opposite second axial side of the bulkhead facing the first brake.

In a preferred embodiment, the bulkhead has fluid supply openings through which the first clutch actuation unit and/or the first brake actuation unit can be supplied with fluid to provide an actuation pressure. This enables an integrated and space-saving fluid supply.

Further advantages and advantageous embodiments of the disclosure result from the description of the figures and the drawings.

BRIEF DESCRIPTION OF THE DRAWINGS

An embodiment is described in detail below with reference to the drawing, wherein:

FIG. 1: shows a half-section through a hybrid module in a transmission unit in one embodiment of the disclosure.

DETAILED DESCRIPTION

FIG. 1 shows a half-section through a hybrid module 10 in a transmission unit 12 in one embodiment of the disclosure. The hybrid module 10 is used in a drive train of a vehicle and a torque transmission to a downstream transmission 13.

The hybrid module 10 has a first electric motor 14 with a stator 16 and a rotor 18. The rotor 18 is arranged radially outside of a first clutch 20, which can be actuated by a first clutch actuation unit 22 and has a first multiple clutch disc assembly 24, a first clutch input 26 and a first clutch output 28. When the first clutch 20 is actuated, the first clutch input 26 and the first clutch output 28 are connected to one another via the first multiple clutch disc assembly 24. When the first clutch 20 is open, the torque transmission between the first clutch input 26 and the first clutch output 28 is interrupted.

The first electric motor 14 operates in a P1 arrangement and the first clutch input 26 is securely connected to the rotor 18. Furthermore, the first clutch input 26 is connected, via a radially extending section 30, to a drive shaft 32, which is coupled to a crankshaft of an internal combustion engine, whereby both the torque output by the internal combustion engine and the torque provided by the first electric motor 14 at the first clutch input 26 can be applied.

The first clutch 20 is operated by the first clutch actuating unit 22. The first clutch actuation unit 22 comprises a first pressure pot 34 which can initiate an actuation force on the first clutch 20. The first pressure pot 34 is moved against a restoring force of a first restoring spring 36. The first clutch actuation unit 22 comprises a CSC actuation and thereby a first clutch actuation piston 38 which is slidably received in a first receptacle 40 and transmits the actuation force to the first pressure pot 34 via a first actuation bearing 42.

A second clutch 44 is arranged radially nested with the first clutch 20. The second clutch 44 can be actuated by a second clutch actuation unit 46 and comprises a second multiple clutch disc assembly 48, a second clutch input 50 and a second clutch output 52. The second clutch input 50 and the second clutch output 52 are connected to one another via the second multiple clutch disc assembly 48 when the second clutch 44 is actuated. When the second clutch 44 is opened, the torque transmission between the second clutch input 50 and the second clutch output 52 is interrupted.

The first clutch output 28 and the second clutch input 50 are configured in one piece with one another. The second clutch input 50 and thus also the first clutch output 28 are connected to a second electric motor 54. The second electric motor 54 can operate in a P3 arrangement and can be assigned to the transmission 13. The second electric motor 54 can be arranged in the transmission 13, for example.

The second clutch output 52 can be connected to a first transmission input shaft of the transmission 13. The transmission 13 can be a dedicated hybrid transmission (DHT) having a planetary gear. When the first clutch 20 and the second clutch 44 are closed, a torque transmission can take place between the internal combustion engine and/or the first electric motor 14 and the first transmission input shaft. When the first clutch 20 is open and the second clutch 44 is closed, a torque transmission is effected between the second electric motor 54 and the first transmission input shaft. The second electric motor 54 is connected to the second clutch input 50 via a second transmission input shaft that can be connected to the first clutch input 50. The second transmission input shaft can be designed as a solid shaft and the first transmission input shaft can be designed as a hollow shaft that radially surrounds the solid shaft.

The second clutch 44 is operated by the second clutch actuating unit 46. The second clutch actuation unit 46 comprises a second pressure pot 56, which can initiate an actuation force on the second clutch 44. The second pressure pot 56 is moved against a restoring force of a second restoring spring 58. The second clutch actuation unit 46 comprises a CSC actuation and thereby a second clutch actuation piston 60, which is slidably received in a second receptacle 62 and transmits the actuation force to the second pressure pot 56 via a second actuation bearing 64.

The hybrid module 10 is received in a housing 66. Power electronics 67, in particular for controlling the first electric motor 14, are arranged on an outer circumference. The stator 16 is screwed to the housing 66. A bulkhead 68 is fastened to the housing 66. The bulkhead 68 is arranged axially between the first and second clutches 20, 44 and the transmission 13 and is releasably connected to the housing 66. The bulkhead 68 is fixedly and releasably connected to the housing 66 independently of the first clutch 20, the second clutch 44 and the first electric motor 14. The bulkhead 68 is designed in two parts and a first bulkhead part 70 is screwed to the housing 66. A second bulkhead part 72 is screwed onto the first bulkhead part 70. A rotor position sensor 75 is arranged on the first bulkhead part 70.

The hybrid module 10 is enclosed on the transmission side by the bulkhead 68 and axially opposite by the housing 66. A shaft sealing ring 74, which seals a fluid chamber occupied by the hybrid module 10, is arranged between the housing 66 and the drive shaft 32. The first and second clutches 20, 44 run wet and can be cooled by cooling oil. The cooling oil can also cool the first electric motor 14 arranged radially outside the first and second clutches 20, 44. The hybrid module 10 shares a common fluid chamber with the transmission 13. The bulkhead 68 can enable a fluid passage.

The first clutch actuation unit 22 and the second clutch actuation unit 46 are nested radially and each arranged on the bulkhead 68. The first receptacle 40 and the second receptacle 62 are each connected to the bulkhead 68 as a separate component. The bulkhead 68, here the second bulkhead part 72, has fluid supply openings 76 through which the first clutch actuation unit 22 and the second clutch actuation unit 46 can be supplied with fluid to provide an actuation pressure.

A first support bearing 78 is arranged in a radially inner region of the bulkhead 68 and enables the second clutch input 50 to be supported via a support plate 80 on the bulkhead 68. Both a radial and axial centering of the second clutch input 50 and a support of the actuating force acting on the second clutch 44 on the bulkhead 68 can be effected. The flow of force for supporting the actuation force of the second clutch 44 can thus take place over short distances and closed in the hybrid module 10. The actuating force of the first clutch 20 is supported via the first clutch input 26 via a second support bearing 82 on the housing 66. The power flow is conducted, via the housing 66, to the bulkhead 68 and closed thereover.

The first and second clutch actuation units 22, 46 are arranged on the first axial side 84 of the bulkhead 68 facing one of the first and second clutches 20, 44. On a second axial side 86 of the bulkhead 68 opposite the first axial side 84 are arranged a first brake 88 and a second brake 90 arranged radially nested with respect thereto. The first and second brakes 88, 90 are active in the transmission 13. The transmission 13 comprises a planetary gear set, the individual gear stages of which can be set by the first and second brakes 88, 90, and the transmission ratios can consequently be selected.

The first brake 88 comprises a first support element 92 fixed to the housing, in particular an outer plate carrier and a first rotary element 94, in particular an inner plate carrier, which can be braked by the first brake 88, wherein the first support element 92 is connected in a rotationally fixed manner to the bulkhead 68, in particular being releasably screwed. The first brake 88 comprises a first friction disc assembly 96 which can bring about a frictional connection between the first support element 92 and the first rotational element 94 via a first brake actuation unit 98, which has a displaceable, in particular axially displaceable, first brake actuation piston 99. The first friction disc assembly 96 can have first brake friction plates 100, which can have a friction lining on one and only one axial side. The first brake actuation unit 98 is arranged directly on the second axial side 86 of the bulkhead 68.

The second brake 90 comprises a second support element 104 fixed to the housing, in particular an outer plate carrier, and a second rotational element 106, in particular an inner plate carrier, which can be braked by the second brake 90. The second rotational element 106 is connected to a sun gear of the planetary gear, for example. The second support element 104 is configured in one piece from the bulkhead 68. The second brake 90 comprises a second friction disc assembly 108, which, via a second brake actuation unit 110 which is arranged directly on the second axial side 86 of the bulkhead 68 and has a displaceable, in particular axially displaceable, second brake actuation piston 112, can effect a frictional connection between the second support element 104 and the second rotational element 106. The second friction disc assembly 108 can have second brake friction plates 114, which can have a friction lining on one and only one axial side.

The bulkhead 68 has further fluid supply openings through which the first brake actuation unit 98 and the second brake actuation unit 110 can be supplied with fluid for providing an actuation pressure.

LIST OF REFERENCE SYMBOLS

10 Hybrid module
12 Transmission unit
13 Transmission
14 First electric motor
16 Stator
18 Rotor
20 First clutch
22 First actuation unit
24 First multiple clutch disc assembly
26 First clutch input
28 First clutch output
30 Section
32 Drive shaft
34 First pressure pot
36 First return spring
38 First clutch actuating piston
40 First receptacle
42 First actuation bearing
44 Second clutch
46 Second clutch actuation unit
48 Second multiple clutch disc assembly
50 Second clutch input
52 Second clutch output
54 Second electric motor 56 Second pressure pot
58 Second return spring
60 Second clutch actuation unit
62 Second receptacle
64 Second actuation bearing
66 Housing
67 Power electronics
68 Bulkhead
70 First bulkhead part
72 Second bulkhead part
74 Shaft sealing ring
75 Rotor position sensor
76 Fluid supply opening
78 First support bearing
80 Support plate
82 Second support bearing
84 First axial side
86 Second axial side
88 First brake
90 Second brake
92 First support element
94 First rotational element
96 First friction disk assembly
98 First brake actuation unit
99 First brake actuation piston
100 First brake friction plates
104 Second support element
106 Second rotational element
108 Second friction disk assembly
110 Second brake actuation unit
112 Second brake actuation piston
114 Second brake friction plates

The invention claimed is:

1. A hybrid module for transmission of torque in a drive train of a vehicle having a transmission, the hybrid module comprising:
a first electric motor;
a first clutch that is actuatable by a first clutch actuator, and including a first multiple clutch disc assembly, a first clutch input and a first clutch output;
a second clutch that is actuatable by a second clutch actuator and has a second multiple clutch disc assembly, a second clutch input, and a second clutch output; and
a bulkhead adapted to be attached to a housing that receives the hybrid module;
wherein the bulkhead is arranged axially between the first clutch and the transmission and is configured to be releasably connected to the housing, the first clutch actuator is arranged on the bulkhead on a first axial side of the bulkhead facing the first clutch, and the first clutch actuator is arranged axially between the first clutch and the transmission.

2. The hybrid module according to claim 1, wherein the hybrid module is adapted to be enclosed on a transmission side by the bulkhead and axially opposite by the housing.

3. The hybrid module according to claim 1, wherein the bulkhead is configured to be fixedly and releasably connected to the housing independently of the first clutch and the first electric motor.

4. The hybrid module according to claim 1 the first clutch actuator comprises a first clutch actuation piston, which is slidably received in a first receptacle, and the first receptacle as a separate component is connected to the bulkhead or is configured in one piece from the bulkhead.

5. The hybrid module according to claim 1, further comprising a first support bearing arranged on the bulkhead.

6. The hybrid module according to claim 5, wherein the first support bearing is arranged on a radially inner region of the bulkhead.

7. A transmission unit in a drive train of a vehicle, comprising the hybrid module according to claim 1, the housing that receives the hybrid module, and at least one first brake of a transmission, the first brake has a first support element fixed to the housing and a first rotary element that is configured to be braked by the first brake, wherein the first support element is connected to the bulkhead in a rotationally fixed manner or is configured in one piece from the bulkhead.

8. The transmission unit according to claim 7, wherein the first clutch actuator is arranged on a first axial side of the bulkhead facing the first clutch and a first brake actuator is arranged on a second axial side of the bulkhead that is opposite and faces the first brake.

9. The transmission unit according to claim 8, wherein the bulkhead has fluid supply openings, through which at least one of the first clutch or the first brake actuator are adapted to be supplied with fluid to provide an actuation pressure.

10. The hybrid module according to claim 1, wherein the second clutch is radially nested within the first clutch.

11. The hybrid module according to claim 1, wherein the first clutch and the second clutch are each arranged on the bulkhead.

12. A hybrid module for transmission of torque in a vehicle drive train, the hybrid module comprising:
a first electric motor;
a first clutch actuatable by a first clutch actuator, and including a first multiple clutch disc assembly, a first clutch input, and a first clutch output;
a second clutch that is actuatable by a second clutch actuator and has a second multiple clutch disc assembly, a second clutch input, and a second clutch output; and
a bulkhead adapted to be attached to a housing that receives the hybrid module, the first clutch actuator being arranged on the bulkhead;
wherein the bulkhead is arranged axially between the first clutch and a vehicle transmission and is configured to be releasably connected to the housing.

13. The hybrid module of claim 12, wherein the hybrid module is adapted to be enclosed on a transmission side by the bulkhead and on an axially opposite side by the housing.

14. The hybrid module of claim 12, wherein the bulkhead is configured to be fixedly and releasably connected to the housing independently of the first clutch and the first electric motor.

15. The hybrid module of claim 12, wherein the first clutch actuator comprises a first clutch actuation piston which is slidably received in a first receptacle, and the first receptacle is connected to the bulkhead or is configured in one piece from the bulkhead.

16. The hybrid module of claim 12, further comprising a first support bearing arranged on the bulkhead.

17. The hybrid module of claim 16, wherein the first support bearing is arranged on a radially inner region of the bulkhead.

18. A transmission unit in a drive train of a vehicle, the transmission unit comprising:
a transmission;
a hybrid module comprising:
a first electric motor;
a first clutch that is actuatable by a first clutch actuator, and including a first multiple clutch disc assembly, a first clutch input and a first clutch output; and a bulkhead adapted to be attached to a housing that receives the hybrid module, wherein the bulkhead is arranged axially between the first clutch and the transmission and is configured to be releasably connected to the housing; and at least one first brake of the transmission, the first brake including a first support element fixed to the housing and a first rotary element that is configured to be braked by the first brake, wherein the first support element is connected to the bulkhead in a rotationally fixed manner or is configured in one piece from the bulkhead.

* * * * *